US011978465B2

(12) United States Patent
Beack et al.

(10) Patent No.: US 11,978,465 B2
(45) Date of Patent: May 7, 2024

(54) METHOD OF GENERATING RESIDUAL SIGNAL, AND ENCODER AND DECODER PERFORMING THE METHOD

(71) Applicant: ELECTRONICS AND TELECOMMUNICATIONS RESEARCH INSTITUTE, Daejeon (KR)

(72) Inventors: Seung Kwon Beack, Daejeon (KR); Jongmo Sung, Daejeon (KR); Tae Jin Lee, Daejeon (KR); Woo-taek Lim, Daejeon (KR); Inseon Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/507,746

(22) Filed: Oct. 21, 2021

(65) Prior Publication Data

US 2022/0157326 A1 May 19, 2022

(30) Foreign Application Priority Data

Nov. 16, 2020 (KR) ........................ 10-2020-0153114

(51) Int. Cl.
*G10L 19/13* (2013.01)
*G10L 19/032* (2013.01)
*G10L 19/06* (2013.01)

(52) U.S. Cl.
CPC ............ *G10L 19/13* (2013.01); *G10L 19/032* (2013.01); *G10L 19/06* (2013.01)

(58) Field of Classification Search
CPC ... G10L 19/032; G10L 19/087; G10L 19/167; G10L 19/13; G10L 19/06; G10L 19/08; G10L 25/90
See application file for complete search history.

(56) References Cited

U.S. PATENT DOCUMENTS

| | | | |
|---|---|---|---|
| 7,599,833 | B2 | 10/2009 | Sung et al. |
| 7,742,912 | B2 | 6/2010 | Den Brinker |
| 10,621,998 | B2 | 4/2020 | Beack et al. |

(Continued)

OTHER PUBLICATIONS

Max Neuendorf et al., "MPEG Unied Speech and Audio Coding—The ISO/MPEG Standard for High-Efficiency Audio Coding of all Content Types", Audio Engineering Society, 132nd Convention, Apr. 26-29, 2012, Budapest, Hungary.

*Primary Examiner* — Daniel C Washburn
*Assistant Examiner* — Paul J. Mueller
(74) *Attorney, Agent, or Firm* — LRK PATENT LAW FIRM

(57) ABSTRACT

A method of generating a residual signal performed by an encoder includes identifying an input signal including an audio sample, generating a first residual signal from the input signal using linear predictive coding (LPC), generating a second residual signal having a less information amount than the first residual signal by transforming the first residual signal, transforming the second residual signal into a frequency domain, and generating a third residual signal having a less information amount than the second residual signal from the transformed second residual signal using frequency-domain prediction (FDP) coding.

3 Claims, 9 Drawing Sheets

(56) References Cited

U.S. PATENT DOCUMENTS

| | | | | |
|---|---|---|---|---|
| 2011/0145003 | A1* | 6/2011 | Bessette | G10L 19/032 704/500 |
| 2012/0173247 | A1* | 7/2012 | Sung | G10L 19/24 704/500 |
| 2012/0245947 | A1* | 9/2012 | Neuendorf | G10L 19/20 704/500 |
| 2013/0322644 | A1* | 12/2013 | Takahashi | G10L 25/24 381/73.1 |
| 2022/0284908 | A1* | 9/2022 | Guo | G10L 19/02 |

* cited by examiner

METHOD OF GENERATING RESIDUAL SIGNAL, AND ENCODER AND DECODER PERFORMING THE METHOD

CROSS-REFERENCE TO RELATED APPLICATION

This application claims the benefit of Korean Patent Application No. 10-2020-0153114 filed on Nov. 16, 2020, in the Korean Intellectual Property Office, the entire disclosure of which is incorporated herein by reference for all purposes.

BACKGROUND

1. Field of the Invention

One or more example embodiments relate to a method of generating a residual signal, a method of encoding and decoding an audio signal using the method of generating a residual signal, and apparatuses performing the methods, and more particularly, to a technology for reducing an amount of information used to generate a residual signal for effective encoding.

2. Description of Related Art

An audio coding technology is to compress and transmit an audio signal, on which continued research is being conducted. An audio coding technology of the Moving Picture Experts Group (MPEG) has been developed to design a quantizer that is based on a human psychoacoustic model and compress data, in order to minimize a perceptual sound quality loss.

The recent introduction of a unified speech and audio coding (USAC) technology has accelerated research on a method of improving a sound quantity of a low bit rate sound. However, the existing audio coding technology may not readily restore an audio signal at a low bit rate due to an amount of information required in an encoding process.

Thus, there is a desire for a technology that may minimize an amount of information required in an encoding process for effective encoding.

SUMMARY

Example embodiments provide a method and apparatus for minimizing an amount of information of a residual signal when encoding and decoding an audio signal, thereby improving the efficiency of quantization.

Example embodiments also provide a method and apparatus for generating a residual signal having a minimum amount of information, thereby effectively restoring an audio signal even when a bit rate is assigned to be low.

According to an aspect, there is provided a method of generating a residual signal performed by an encoder, the method including identifying an input signal including an audio sample, generating a first residual signal from the input signal using linear predictive coding (LPC), generating a second residual signal having a less information amount than the first residual signal by transforming the first residual signal, transforming the second residual signal into a frequency domain, and generating a third residual signal having a less information amount than the second residual signal from the transformed second residual signal using frequency-domain prediction (FDP) encoding.

The method may further include packing the third residual signal into a bitstream by quantizing the third residual signal, and transmitting the bitstream to a decoder.

The generating of the second residual signal may include transforming the first residual signal into the frequency domain, extracting an LPC coefficient from the transformed first residual signal, generating a second residual signal of the frequency domain from the transformed first residual signal using the extracted LPC coefficient, and inversely transforming the second residual signal of the frequency domain into a time domain.

The generating of the third residual signal may include extracting, from the second residual signal, peak information of the second residual signal, and determining the third residual signal processed with harmonic suppression from the second residual signal using the peak information.

The extracting of the peak information may include performing a correlation operation on the second residual signal, extracting peaks of the second residual signal from a result of the correlation operation, generating a pitch chain based on the extracted peaks, and determining the peak information using the pitch chain.

According to another aspect, there is provided a method of generating a residual signal performed by a decoder, the method including unpacking a bitstream received from an encoder, dequantizing a third residual signal extracted from the unpacked bitstream, determining a second residual signal transformed into a frequency domain from the dequantized third residual signal using FDP decoding, transforming the second residual signal transformed into the frequency domain into a time domain, and generating a first residual signal having a greater information amount than the second residual signal by inversely transforming a second residual signal transformed into the time domain. An information amount of the second residual signal may be less than that of the dequantized third residual signal.

The method may further include decoding an output signal from the first residual signal using LPC.

The determining of the second residual signal may include extracting peak information of the second residual signal from the unpacked bitstream, and generating the second residual signal transformed into the frequency domain from the dequantized third residual signal and the peak information.

The extracting of the first residual signal may include transforming a second residual signal transformed into the time domain into the frequency domain, extracting an LPC coefficient from the transformed second residual signal, generating a first residual signal of the frequency domain based on the second residual signal and the extracted LPC coefficient, and transforming the first residual signal of the frequency domain into the time domain.

According to still another aspect, there is provided an encoder performing a method of generating a residual signal, the encoder including a processor. The processor may identify an input signal including an audio sample, generate a first residual signal from the input signal using LPC, generate a second residual signal having a less information amount than the first residual signal by transforming the first residual signal, transform the second residual signal into a frequency domain, and generate a third residual signal having a less information amount than the second residual signal from the transformed second residual signal using FDP encoding.

The processor may pack the third residual signal into a bitstream by quantizing the third residual signal, and transmit the bitstream to a decoder.

The processor may transform the first residual signal into the frequency domain, extract an LPC coefficient from the transformed first residual signal, generate a second residual signal of the frequency domain from the transformed first residual signal using the extracted LPC coefficient, and inversely transform the second residual signal of the frequency domain into a time domain.

The processor may extract peak information of the second residual signal from the second residual signal, and determine the third residual signal processed with harmonic suppression from the second residual signal using the peak information.

The processor may perform a correlation operation on the second residual signal, extract peaks of the second residual signal from a result of the correlation operation, generate a pitch chain based on the extracted peaks, and determine the peak information using the pitch chain.

According to yet another aspect, there is provided a decoder performing a method of generating a residual signal, the decoder including a processor. The processor may unpack a bitstream received from an encoder, dequantize a third residual signal extracted from the unpacked bitstream, determine a second residual signal transformed into a frequency domain from the quantized third residual signal using FDP decoding, transform the second residual signal transformed into the frequency domain into a time domain, and generate a first residual signal having a greater information amount than the second residual signal by inversely transforming a second residual signal transformed into the time domain.

The processor may decode an output signal from the first residual signal using LPC.

The processor may extract peak information of the second residual signal from the unpacked bitstream, and generate a second residual signal transformed into the frequency domain from the dequantized third residual signal and the peak information.

The processor may transform the second residual signal transformed into the time domain into the frequency domain, extract an LPC coefficient from the transformed second residual signal, generate a first residual signal of the frequency domain based on the second residual signal and the extracted LPC coefficient, and transform the first residual signal of the frequency domain into the time domain.

Additional aspects of example embodiments will be set forth in part in the description which follows and, in part, will be apparent from the description, or may be learned by practice of the disclosure.

According to example embodiments described herein, it is possible to increase the efficiency of quantization by minimizing an amount of information of a residual signal when encoding and decoding an audio signal.

According to example embodiments described herein, it is possible to effectively restore an audio signal even when a bit rate is assigned to be low by generating a residual signal having a minimum amount of information.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
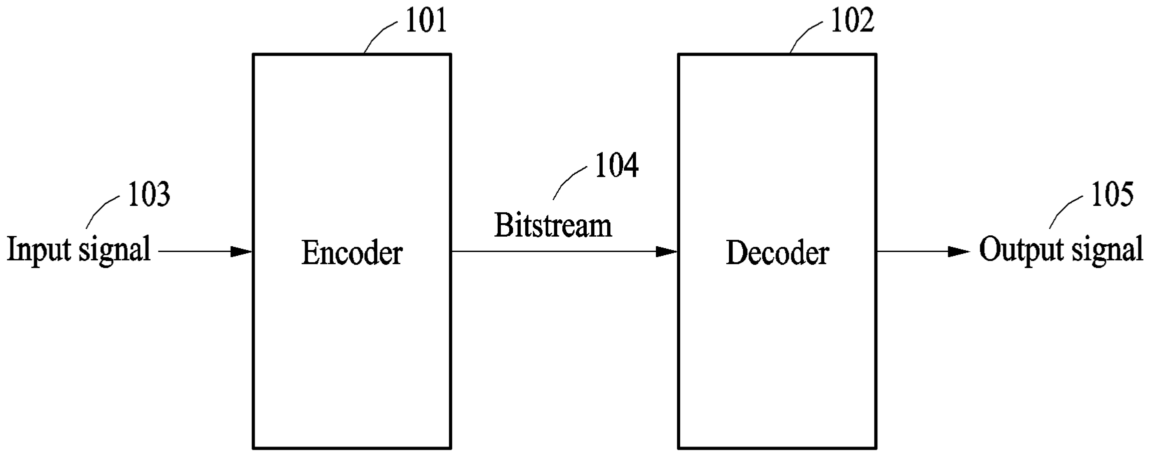
FIG. 1 is a diagram illustrating an example of an encoder and an example of a decoder according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating an example of an encoder and an example of a decoder according to an example embodiment.

The present disclosure relates to a method that may reduce an amount of information of a residual signal to be minimal in a process of generating a residual signal from an audio signal when encoding and decoding the audio signal, and may thus increase the efficiency of encoding, and to an encoder 101 and a decoder 102 that perform the method. The amount of information may also be referred to herein as an information amount for simplicity.

Each of the encoder 101 and the decoder 102 may be a device including a processor, for example, a desktop computer and a laptop computer. The encoder 101 and the decoder 102 may correspond to the same device. A processor included in the encoder 101 and the decoder 102 may perform a method of generating a residual signal described herein.

Referring to FIG. 1, the encoder 101 may receive an input signal 103 including an audio sample and generate a residual signal. That is, the encoder 101 may encode the input signal 103 into the residual signal.

The encoder 101 may quantize the generated residual signal and pack the quantized residual signal into a bitstream. The encoder 101 may transmit the bitstream to the decoder 102. The decoder 102 may generate a residual signal by unpacking the bitstream received from the encoder 101, and decode an output signal 104 corresponding to the input signal 103 from the residual signal.

The method described herein may generate a residual signal having a reduced information amount by processing a residual signal which is a target for quantization and encode and decode the generated residual signal, thereby increasing the efficiency of quantization. A detailed description of operations performed in the encoder 101 and the decoder 102 will be provided hereinafter with reference to FIG. 2.

Figure 2:
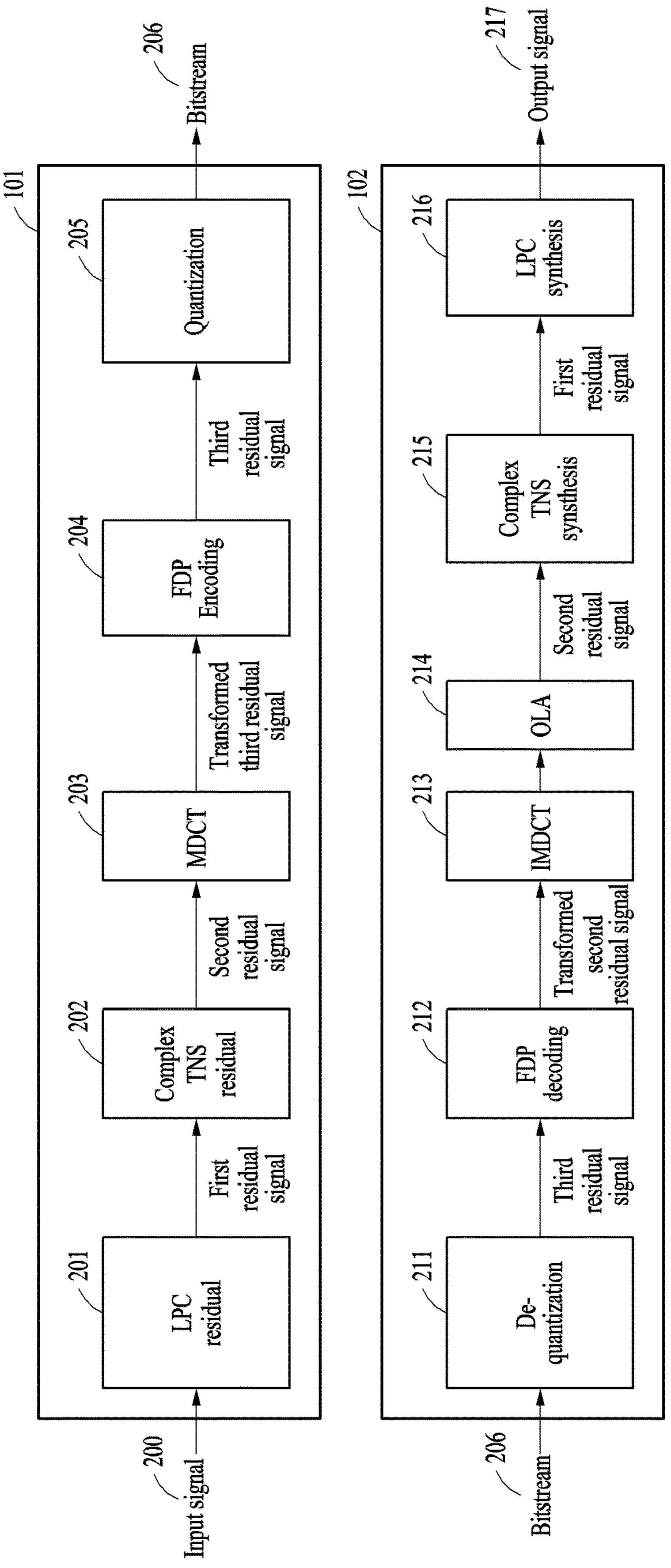
FIG. 2 is a diagram illustrating an example of a method of generating a residual signal performed by an encoder and a decoder according to an example embodiment.

FIG. 2 is a diagram illustrating an example of a method of generating a residual signal performed by an encoder and a decoder according to an example embodiment.

Referring to FIG. 2, the encoder 101 may perform operations 201 through 205 to generate a residual signal from an input signal 200 and encode the generated residual signal. In operation 201 for linear predictive coding (LPC), the encoder 101 may identify the input signal 200 corresponding to an audio signal and generate a first residual signal from the input signal 200 through LPC. That is, the encoder 101 may generate the first residual signal from the input signal 200 through LPC.

For example, the encoder 101 may determine the first residual signal from the input signal 200, as represented in Equation 1 below.

$$r(n) = x(n) - \sum_{k=1}^{p} a_k x(n-k) \quad \text{[Equation 1]}$$

In Equation 1 above, x(n) denotes an nth audio sample of the input signal 200. p denotes an LPC order. $a_k$ denotes a kth LPC coefficient. r(n) denotes a first residual signal corresponding to the nth audio sample.

In operation 202 for complex temporary noise shaping (TNS) residual, the encoder 101 may generate a second residual signal by transforming the first residual signal. The second residual signal may be a residual signal having a less information amount than the first residual signal. A detailed description of this operation will be provided with reference to FIG. 3.

In operation 203 for modified discrete cosine transform (MDCT), the encoder 101 may transform the second residual signal into a frequency domain. For example, the encoder 101 may transform the second residual signal into the frequency domain by performing an MDCT on the second residual signal. However, for the transformation into the frequency domain, various methods such as a discrete cosine transform (DCT) and a discrete Fourier transform (DFT) may be used, but examples are not limited thereto.

In operation 204 for frequency-domain prediction (FDP) encoding, the encoder 101 may generate a third residual signal having a less information amount than the second residual signal from the transformed second residual signal, through FDP encoding. The third residual signal may be a residual signal obtained by performing harmonic suppression on the second residual signal.

That is, in operation 204 for FDP encoding, the encoder 101 may generate the third residual signal which is a residual signal for a harmonic component of the transformed second residual signal. A detailed description of this operation will be provided with reference to FIG. 5.

In operation 205 for quantization, the encoder 101 may pack the third residual signal into a bitstream 206 by quantizing the third residual signal. In addition, the encoder 101 may transmit the bitstream 206 to the decoder 102.

The decoder 102 may perform operation 211 through 216 to unpack the bitstream 206 and generate an output signal 217. The decoder 102 may identify the bitstream 206 received from the encoder 101. In operation 211 for dequantization, the decoder 102 may extract a third residual signal from the unpacked bitstream 206 and dequantize the third residual signal.

In operation 212 for FDP decoding, the decoder 102 may determine, from the third residual signal, a second residual signal transformed into a frequency domain, through FDP decoding. A detailed description of this FPD decoding operation 212 will be provided with reference to FIG. 7.

In operation 213 for inverse MDCT (IMDCT), the decoder 102 may transform the second residual signal transformed into the frequency domain into a time domain. Here, an IMDCT may be an inverse transformation method of an MDCT. The inverse transformation method may be determined based on a method for a transformation into a frequency domain.

In operation 214 for overlap-add (OLA), which is an operation of removing aliasing in the time domain that may occur in an MDCT process, the decoder 102 may perform an OLA operation on a second residual signal transformed into the time domain.

In operation 215 for complex TNS synthesis, the decoder 102 may generate a first residual signal having a greater information amount than the second residual signal by inversely transforming the second residual signal transformed into the time domain. A detailed description of this operation will be provided with reference to FIG. 4.

In operation 216 for LPC synthesis, the decoder 102 may restore an original signal from the first residual signal through LPC. That is, the decoder 102 may generate the output signal 217 which is the original signal from the first residual signal. The decoder 102 may decode the output signal 217 from the first residual signal through LPC. For example, the decoder 102 may obtain the output signal 217 as represented by Equation 2 below.

$$x(n)=\sum_{k=1}^{p}a_k x(n-k)+r(n) \quad \text{[Equation 2]}$$

In Equation 2 above, x(n) denotes an nth audio sample of the output signal 217. p denotes an LPC order. $a_k$ denotes a kth LPC coefficient. r(n) denotes a first residual signal corresponding to the nth audio sample.

Figure 3:
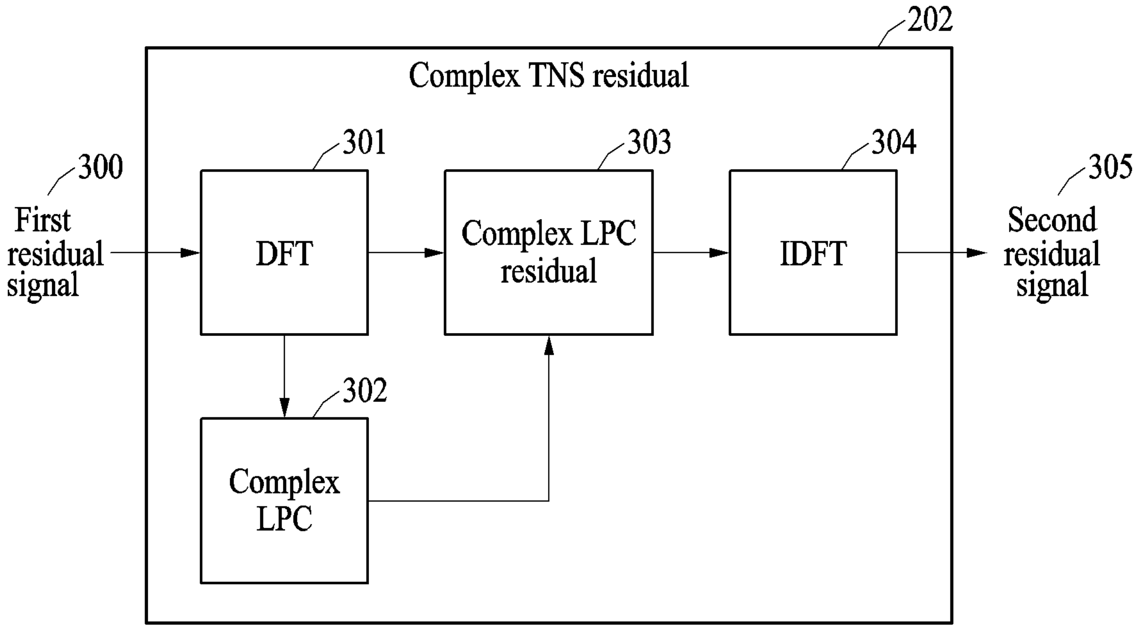
FIG. 3 is a diagram illustrating an example of generating a second residual signal by an encoder according to an example embodiment.

FIG. 3 is a diagram illustrating an example of generating a second residual signal by an encoder according to an example embodiment.

An encoder may perform operations 301 through 304 to generate a second residual signal 305 from a first residual signal 300. The operations to be described hereinafter with reference to FIG. 3 are detailed operations in operation 202 described above with reference to FIG. 2.

In operation 301 for DFT, the encoder may transform the first residual signal 300 into a frequency domain. For example, the encoder may transform the first residual signal 300 into the frequency domain by performing a DFT on the first residual signal 300.

In this example, the first residual signal 300 may be represented as a complex signal including a real part and an imaginary part. In operation 302 for complex LPC, the encoder may extract an LPC coefficient for each of the real part and the imaginary part of the transformed first residual signal 300.

In operation 303 for complex LPC residual, the encoder may generate the second residual signal 305 by determining a residual signal for each of the real part and the imaginary part of the first residual signal 300 transformed into the frequency domain, using the extracted LPC coefficient for each of the real part and the imaginary part.

For example, the encoder may determine a residual signal for the real part of the first residual signal 300 based on the LPC coefficient for the real part. The determined residual signal may correspond to a real part of the second residual signal 305. In addition, the encoder may determine a residual signal for the imaginary part of the first residual signal 300 based on the LPC coefficient for the imaginary part. The determined residual signal may correspond to an imaginary part of the second residual signal 305.

For example, the encoder may determine the residual signal for each of the real part and the imaginary part of the first residual signal 300, using Equation 1 above.

The generated second residual signal 305 may be represented in the frequency domain. In operation 304 for inverse DFT (IDFT), the encoder may transform the first residual signal 300 into a time domain. Referring to FIG. 3, the encoder may generate the second residual signal 305 having an information amount reduced from that of the first residual signal 300, using the LPC coefficient for each of the real part and the imaginary part of the first residual signal 300 transformed into the frequency domain.

In addition, for a decoder to generate the first residual signal 300 from the second residual signal 305, the encoder may quantize, along with a third residual signal, the LPC coefficients extracted from the first residual signal 300 transformed as a complex signal, and pack it into a bitstream and transmit the bitstream to the decoder.

Figure 4:
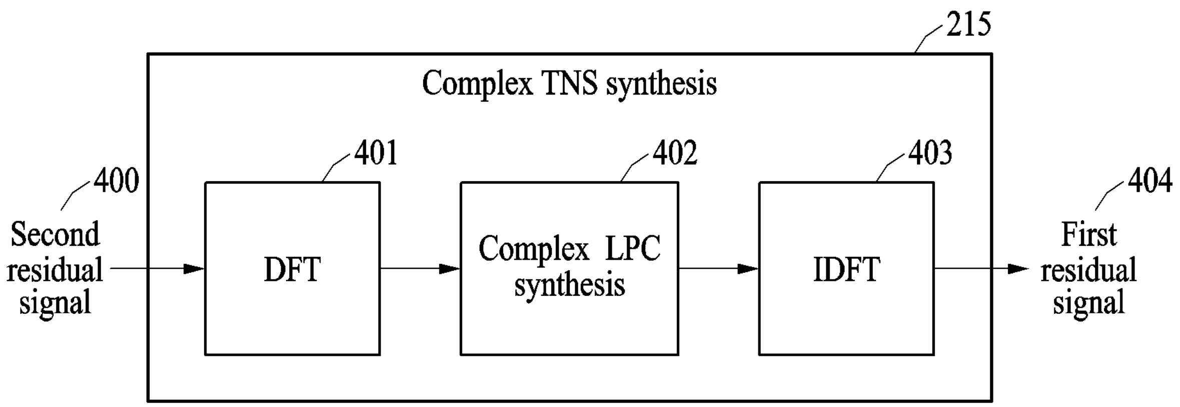
FIG. 4 is a diagram illustrating an example of generating a first residual signal by a decoder according to an example embodiment.

FIG. 4 is a diagram illustrating an example of generating a first residual signal by a decoder according to an example embodiment.

A decoder may perform operations 401 through 403 to generate a first residual signal 404 from a second residual signal 400, which is an inverse version of the operations described above with reference to FIG. 3. The operations to be described hereinafter with reference to FIG. 4 are detailed operations in operation 215 described above with reference to FIG. 2.

For example, the decoder may unpack a bitstream and perform dequantization to obtain an LPC coefficient extracted from a first residual signal transformed as a complex signal in an encoder. The obtained LPC coefficient may include an LPC coefficient for a real part and an LPC coefficient for an imaginary part. The decoder may generate the first residual signal 404 from the second residual signal 400 using the LPC coefficient.

In operation 401 for DFT, the decoder may transform the second residual signal 400 represented in a time domain into a frequency domain. For example, the decoder may transform the second residual signal 400 into the frequency domain by performing a DFT on the second residual signal 400.

The transformed second residual signal 400 may be represented as a complex signal including a real part and an imaginary part. In operation 402 for complex LPC synthesis, the decoder may restore the first residual signal 404 which is an original signal of the second residual signal 400, using the LPC coefficient received from the encoder.

That is, in operation 402 for complex LPC synthesis, the decoder may generate the first residual signal 404 by determining an original signal for each of the real part and the imaginary part of the second residual signal 400 transformed into the frequency domain, using the LPC coefficient for each of the real part and the imaginary part. For example, the decoder may determine the original signal for each of the real part and the imaginary part of the second residual signal 400, using Equation 2 above.

The generated first residual signal 404 may be represented in the frequency domain. In operation 403 for IDFT, the decoder may transform the first residual signal 404 into the time domain. Referring to FIG. 4, the decoder may restore the first residual signal 404 from the second residual signal 400, using LPC on the real part and the imaginary part of the second residual signal 400.

Figure 5:
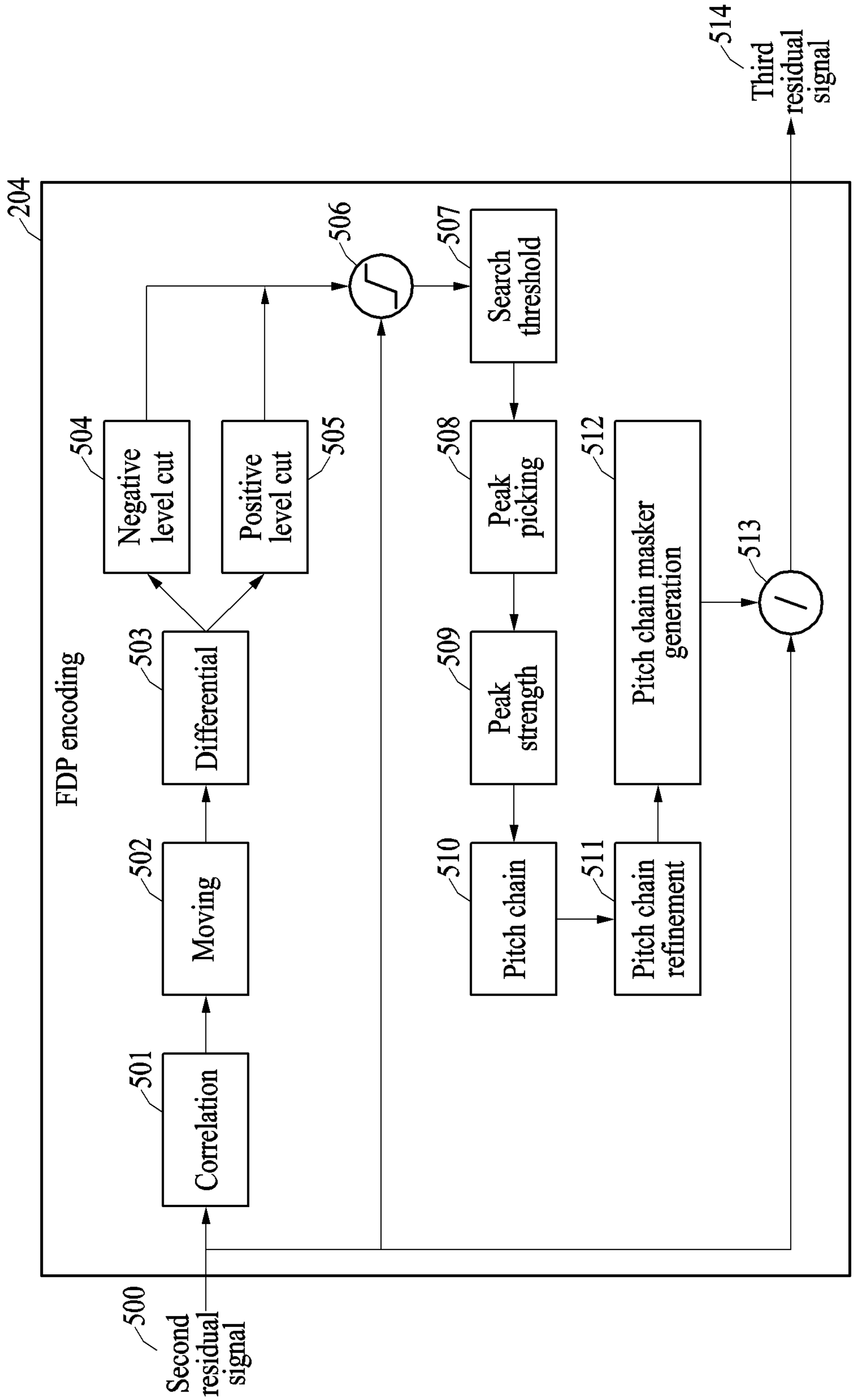
FIG. 5 is a diagram illustrating an example of generating a third residual signal by an encoder according to an example embodiment.

FIG. 5 is a diagram illustrating an example of generating a third residual signal by an encoder according to an example embodiment.

An encoder may perform operations 501 through 513 for FPD encoding to generate a third residual signal 514 obtained by extracting a harmonic component of a second residual signal 500 and processing harmonic suppression thereon. An information amount of the third residual signal 514 may be less than an information amount of the second residual signal 500. The operations to be described hereinafter with reference to FIG. 4 are detailed operations in operation 204 described above with reference to FIG. 2.

For example, the encoder may perform operations 501 through 509 for harmonic prediction on the second residual signal 500. In operation 501 for correlation, the encoder may perform a correlation operation on the second residual signal 500. The encoder may obtain a resultant signal by inputting the second residual signal 500 to a correlation function. For example, the second residual signal 500 and the resultant signal obtained by performing the correlation operation on the second residual signal 500 may be as shown in upper and middle portions of FIG. 6A.

Operation 502 for moving may be to calculate a moving average. In operation 502 for moving, the encoder may determine a moving average of the resultant signal obtained by inputting the second residual signal 500 to the correlation function. For example, the encoder may obtain an average signal determined by the moving average of the resultant signal by calculating an average of resultant signals for respective intervals and determining the calculated average as a representative value for each of the intervals.

For example, an interval may be a length corresponding to three or five audio samples. The average signal of the resultant signal obtained by inputting the second residual signal 500 to the correlation function may be as shown in a lower portion of FIG. 6A.

Operation 503 for differential may be to obtain a differential signal. In operation 503 for differential, the encoder may determine a differential signal of the average signal. For example, the encoder may determine the differential signal by calculating a difference between neighboring average signals adjacent to each other in time. For example, the differential signal may be as shown in an upper portion of FIG. 6B.

Operation 504 for negative level cut and operation 505 for positive level cut may be to clarify operation 508 for peak picking, and to identify a negative signal and a positive signal from the differential signal. In operation 504 for negative level cut and operation 505 for positive level cut, the encoder may determine a minimum value in the negative signal and a maximum value in the positive signal. The minimum value and the maximum value may be based on a zero index.

In operation 506, the encoder may clip the differential signal divided into the negative and positive signals based on the minimum value and the maximum value.

In operation 507 for search threshold, the encoder may determine a threshold value based on a power value of each of peaks from the differential signal divided into the negative and positive signals. In operation 508 for peak picking, the encoder may extract peaks that exceed the threshold value from the differential signal divided by the negative and positive signals. That is, the encoder may extract peaks of the second residual signal 500 from the resultant signal which is a result of the correlation operation.

In operation 509 for peak strength, the encoder may verify whether the determined peaks are valid or not. For example, when a power value of a current peak is 50% or greater of a power value of a previous peak, the encoder may determine the current peaks as a valid peak. In contrast, when the power value of the current peak is less than 50% of the power value of the previous peak, the encoder may determine the current peak as an invalid peak.

In operation 510 for pitch chain, the encoder may determine a pitch chain based on peaks determined to be valid. For example, a pitch chain of the second residual signal 500 shown in the upper portion of FIG. 6A may be represented as shown in a lower portion of FIG. 6B. The pitch chain may include the valid peaks of the second residual signal 500, and indicate a harmonic component of the second residual signal 500. The encoder may generate the pitch chain based on an interval between the valid peaks.

Operation 511 for pitch chain refinement may be to adjust a position of the harmonic component to accurately correspond to the pitch chain. In operation 511 for pitch chain refinement, the encoder may search for a local maximum peak again based on the determined pitch chain, and update the pitch chain with the retrieved peak. For example, the encoder may search for the local maximum peak again by searching for a new maximum value in a preset interval based on a position of each peak.

Figure 6A:
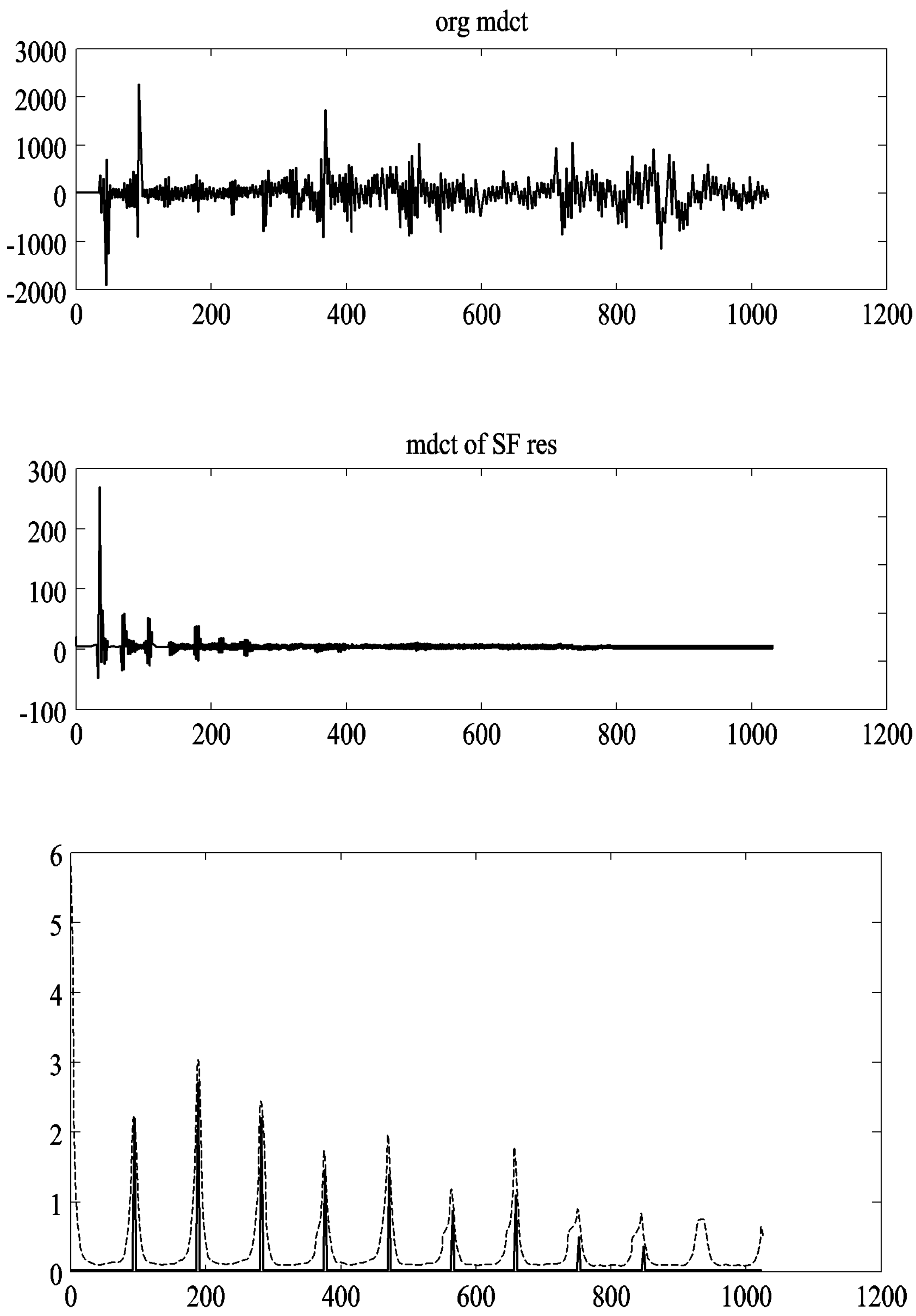
FIGS. 6A through 6C are graphs illustrating examples of generating a third residual signal by an encoder according to an example embodiment.
Figure 6B:
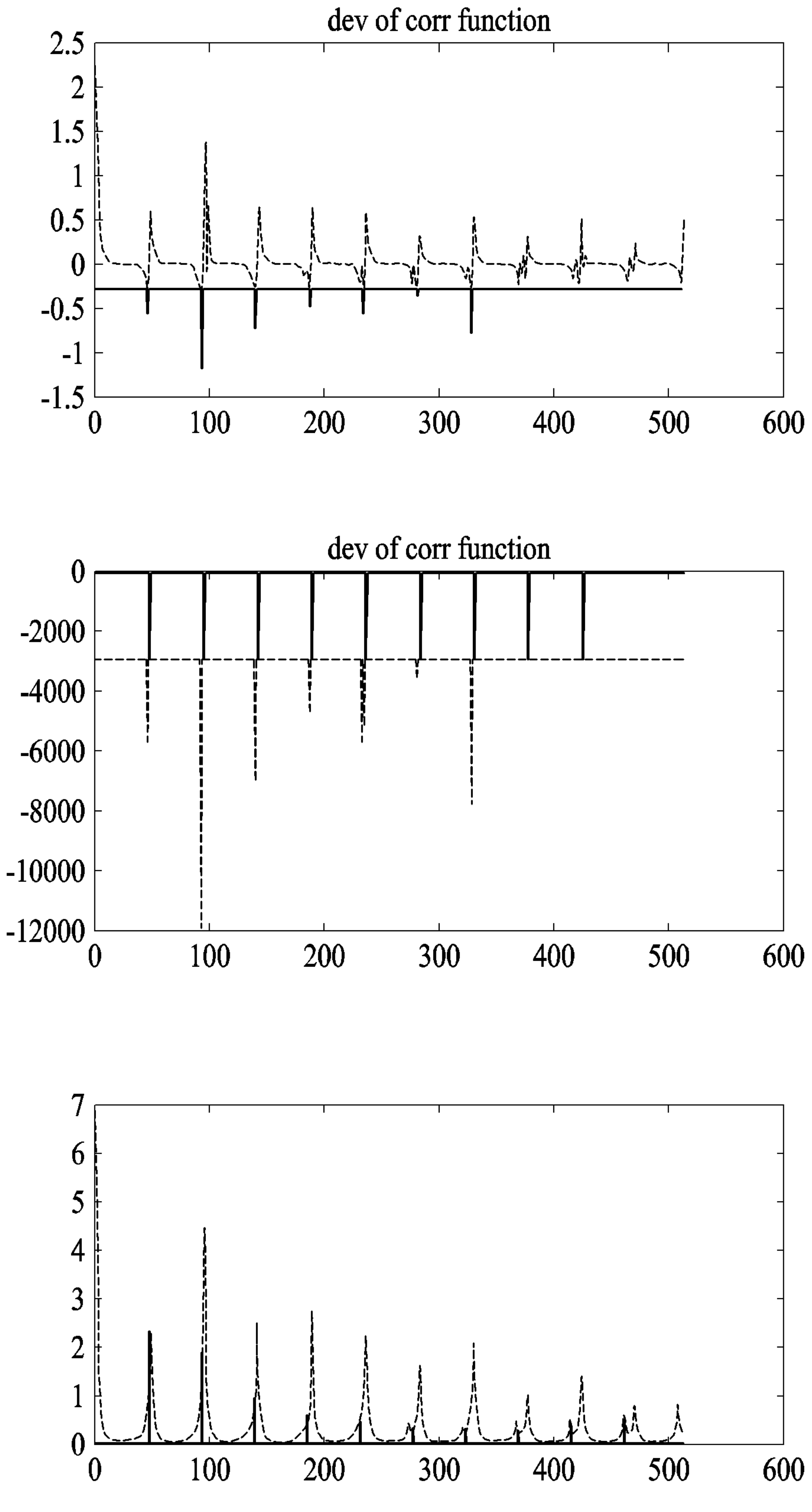
Figure 6C:
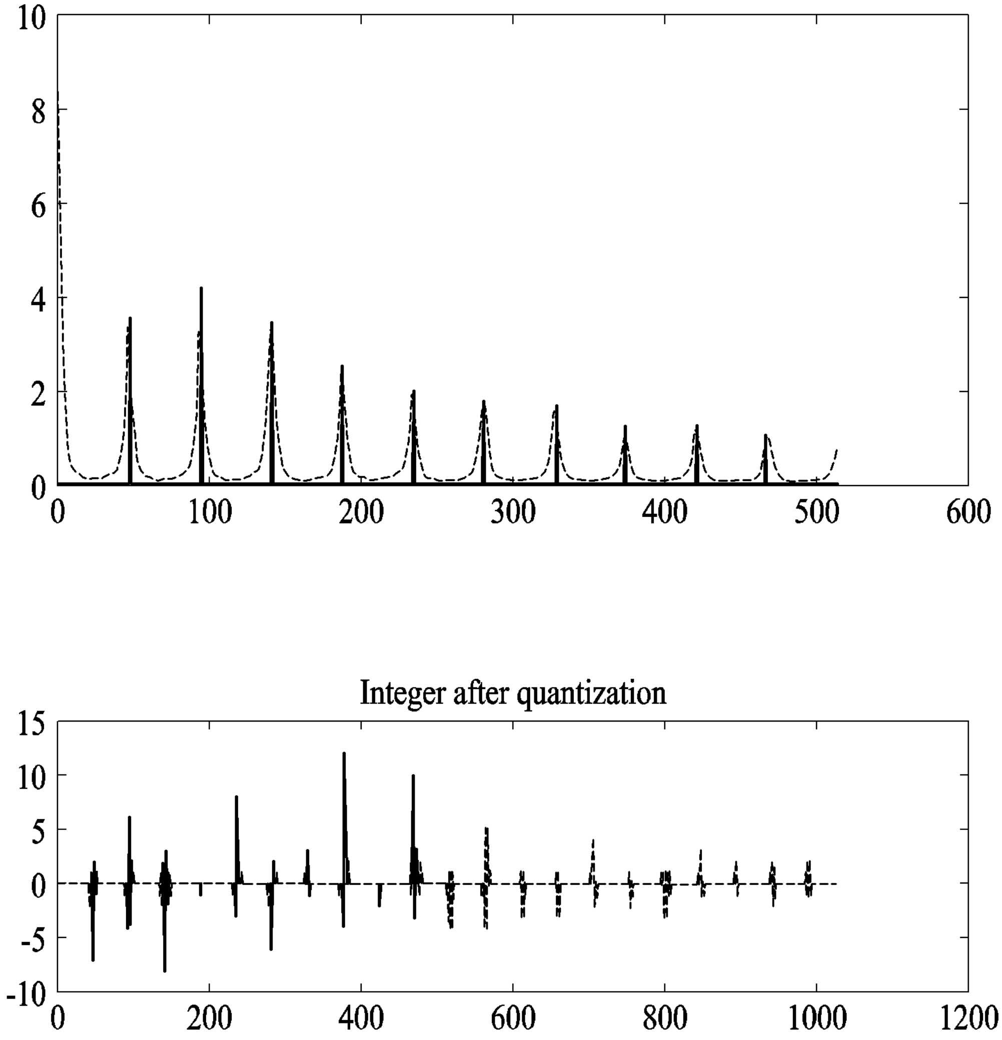

For example, the updated pitch chain may be as shown in an upper portion of FIG. 6C.

In operation 512 for pitch chain masker generation, the encoder may determine information associated with the peaks of the second residual signal 500 based on the updated pitch chain, and generate a pulse masker for attenuating energy of a peak portion in the second residual signal 500 using the information. The information associated with the peaks will be simply referred to hereinafter as peak information, and the peak information may include, for example, positions of the peaks. As the size of a pulse in the pulse masker increases, the degree of such attenuation may increase.

The size of a pulse may be determined by a predetermined pulse scale factor. The pulse masker may represent data including pulse position information.

The peak information may be quantized along with the third residual signal 514 and packed into a bitstream to be transmitted to a decoder. In operation 513, the encoder may determine the third residual signal 514 processed through harmonic suppression from the second residual signal 500 using the peak information.

For example, in operation 513, the encoder may perform an operation of dividing elementwise the second residual signal 500 by the pulse mask. That is, the encoder may generate the third residual signal 514 from the second residual signal 500 using the pulse masker generated from the peak information.

The third residual signal 514 may have a less information amount than the second residual signal 500. For example, the third residual signal 514 processed through harmonic suppression may be represented as shown in a middle portion of FIG. 6C.

FIGS. 6A through 6C are graphs illustrating examples of generating a third residual signal by an encoder according to an example embodiment.

In the graphs in FIGS. 6A through 6C, a vertical axis indicates pulse size, and a horizontal axis indicates frequency.

The upper portion of FIG. 6A illustrates an example of a second residual signal used in the process of FDP encoding described above with reference to FIG. 5. In the graphs, an x axis indicates time, and a y axis indicates frequency amplitude. The graph in the upper portion of FIG. 6A may be a graph of a frequency amplitude of a second residual signal transformed through an MDCT, with respect to time.

The middle portion of FIG. 6A illustrates an example of a resultant signal obtained by performing a correlation operation on a second residual signal. That is, the middle portion illustrates a graph of a result obtained by inputting the second residual signal to a correlation function.

The lower portion of FIG. 6A illustrates an example of an average signal determined by a moving average of the resultant signal illustrated in the middle portion of FIG. 6A. The upper portion of FIG. 6B illustrates an example of a differential signal of an average signal. In the lower portion of FIG. 6A, the upper, middle, and lower portions of FIG. 6B, and upper and lower portions of FIG. 6C, a solid line indicates a signal with a negative amplitude, and a broken line indicates a signal with a positive amplitude. The signals with such negative and positive amplitudes may be determined through operations 504 for negative level cut and operation 505 for positive level cut described above with reference to FIG. 5.

The middle and lower portions of FIG. 6B illustrate an example of a pitch chain generated based on peaks of a second residual signal. The upper portion of FIG. 6C illustrates an example of a pitch chain that is updated from the pitch chain illustrated in the lower portion of FIG. 6B such that a harmonic component and a position of the pitch chain correspond to each other.

The lower portion of FIG. 6C illustrates a graph of a result obtained by quantizing a third residual signal generated from the second residual signal illustrated in the upper portion of FIG. 6A. The third residual signal illustrated in the lower portion of FIG. 6C may be a residual signal in which a harmonic component is suppressed from the second residual signal illustrated in the upper portion of FIG. 6A.

Figure 7:
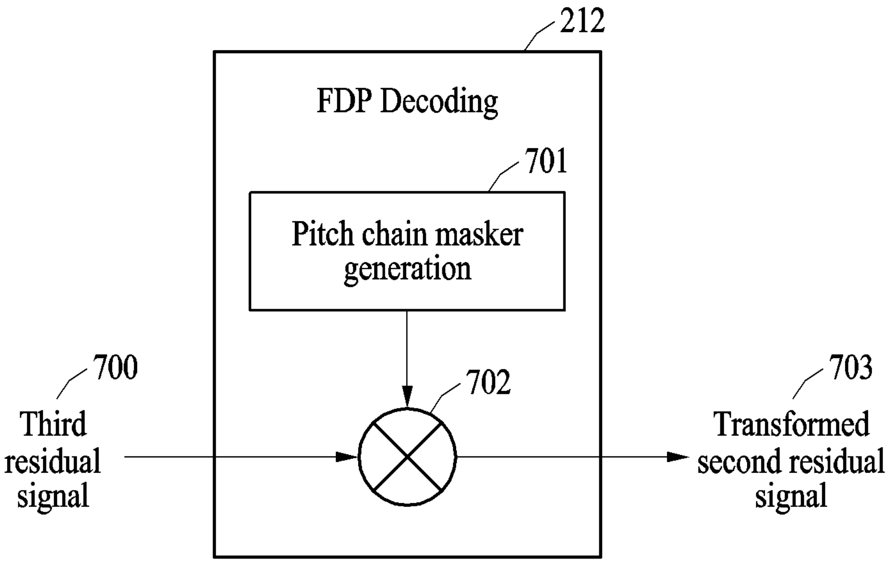
FIG. 7 is a diagram illustrating an example of generating a transformed second residual signal by a decoder according to an example embodiment.

FIG. 7 is a diagram illustrating an example of generating a transformed second residual signal by a decoder according to an example embodiment.

Operations to be described hereinafter with reference to FIG. 7 may be an inverse version of the operations described above with reference to FIG. 5, and may correspond to an FDP decoding process performed to obtain a transformed second residual signal 703 from a third residual signal 700. The operations to be described hereinafter are detailed operations in operation 212 described above with reference to FIG. 2.

A decoder may determine the second residual signal 703 transformed into a frequency domain from the third residual signal 700 through FDP decoding. The transformed second residual signal 703 may be a second residual signal transformed through an MDCT.

Referring to FIG. 7, the decoder may determine the second residual signal 703 using the third residual signal extracted from a bitstream and peak information.

For example, the decoder may generate a pulse masker for a pitch chain used in an encoding process, using the peak information. In operation 702, an decoder may process an operation of multiplying elementwise the pulse masker and the third residual signal 700. In addition, the decoder may generate the second residual signal 703 in which harmonics are restored using the pulse masker and the third residual signal 700.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus and method described herein according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include all computer storage media. In addition, non-transitory computer-readable media may be any available media that may be accessed by a computer and may include both computer storage media and transmission media.

Although the present disclosure includes details of a plurality of specific example embodiments, the details should not be construed as limiting any invention or a scope that can be claimed, but rather should be construed as being descriptions of features that may be peculiar to specific example embodiments of specific inventions. Specific features described in the present disclosure in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present disclosure and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of generating a residual signal performed by a decoder, the method comprising:

unpacking a bitstream received from an encoder;

dequantizing a third residual signal extracted from the unpacked bitstream;

determining a second residual signal transformed into a frequency domain from the dequantized third residual signal, using frequency-domain prediction (FDP) decoding, wherein an information amount of the second residual signal is greater than that of the dequantized third residual signal;

transforming the second residual signal transformed into the frequency domain into a time domain; and generating a first residual signal having a greater information amount than the second residual signal, by inversely transforming a second residual signal transformed into the time domain, wherein the determining of the second residual signal comprises:

extracting peak information of the second residual signal from the unpacked bitstream; and generating the second residual signal transformed into the frequency domain from the dequantized third residual signal and the peak information.

2. The method of claim 1, further comprising decoding an output signal from the first residual signal using linear predictive coding (LPC).

3. The method of claim 1, wherein the extracting of the first residual signal comprises:

transforming a second residual signal transformed into the time domain into the frequency domain;

extracting an LPC coefficient from the transformed second residual signal;

generating a first residual signal of the frequency domain based on the second residual signal and the extracted LPC coefficient; and transforming the first residual signal of the frequency domain into the time domain.

* * * * *